(12) United States Patent
Lee

(10) Patent No.: US 9,698,602 B2
(45) Date of Patent: Jul. 4, 2017

(54) POWER CONTROL SYSTEM AND METHOD THEREFOR

(71) Applicant: Jang Heon Lee, Seoul (KR)

(72) Inventor: Jang Heon Lee, Seoul (KR)

(73) Assignee: Jang Heon Lee, Seoul (KR)

(*) Notice: Subject to any disclaimer, the term of this patent is extended or adjusted under 35 U.S.C. 154(b) by 0 days.

(21) Appl. No.: 15/003,973

(22) Filed: Jan. 22, 2016

(65) Prior Publication Data

US 2016/0218636 A1 Jul. 28, 2016

(30) Foreign Application Priority Data

Jan. 22, 2015 (KR) .................. 10-2015-0010435
Aug. 5, 2015 (JP) .................. 2015-154888
Dec. 28, 2015 (JP) .................. 2015-255957

(51) Int. Cl.
*G05F 1/00* (2006.01)
*H02M 3/335* (2006.01)
*H02J 3/18* (2006.01)
*H02J 3/12* (2006.01)

(52) U.S. Cl.
CPC .............. *H02J 3/1878* (2013.01); *H02J 3/12* (2013.01); *Y02E 40/30* (2013.01)

(58) Field of Classification Search
CPC .... H02M 1/084; H02M 1/0845; H02M 1/088; H02M 3/145; H02M 3/155; H02M 3/158; H02M 3/1584; H02M 3/315; H02M 3/335; H02M 3/33523; G05F 1/563; G05F 1/59; G05F 1/595

USPC ..... 323/241, 274, 283, 284, 287; 363/21.12, 363/21.13, 21.17, 21.18
See application file for complete search history.

(56) References Cited

U.S. PATENT DOCUMENTS

| 5,808,454 | A | * | 9/1998 | Chung | ............... | G05F 1/66 |
| | | | | | | 323/255 |
| 5,821,739 | A | * | 10/1998 | Imoto | ............... | H01F 29/02 |
| | | | | | | 323/255 |
| 6,906,476 | B1 | * | 6/2005 | Beatenbough | ........ | H05B 41/40 |
| | | | | | | 315/209 R |

(Continued)

FOREIGN PATENT DOCUMENTS

JP 7069747 B2 3/1990
JP 08182187 A 7/1996
(Continued)

*Primary Examiner* — Adolf Berhane
*Assistant Examiner* — Gary Nash
(74) *Attorney, Agent, or Firm* — Bacon & Thomas, PLLC

(57) ABSTRACT

The present invention relates to an electric power control system and method therefor, and comprises a control unit 10 and a transformer 20 connected thereto. The control unit 10 detects varying input voltage in real-time, controls switching of triac devices equipped in the transformer, and applies control signal which switches triac device among a plurality of triac devices for target voltage output to the transformer 20. The transformer 20 outputs target voltage by switching tabs of triac devices according to control signal, supplies power by switching tabs of triac devices corresponding to target voltage included in control signal, and preventing EMF induced from primary coil to secondary coil by grounding the tabs of unused triac devices with N-phase for adjustment to the target voltage.

2 Claims, 5 Drawing Sheets

(56) References Cited

U.S. PATENT DOCUMENTS 8,333,265 B2 * 12/2012 Kang .................. B66B 1/30
　　　　　　　　　　　　　　　　　　　　　187/289

FOREIGN PATENT DOCUMENTS

| JP | 20011037227 A | 2/2001 |
| KR | 1020040081414 A | 9/2004 |

* cited by examiner

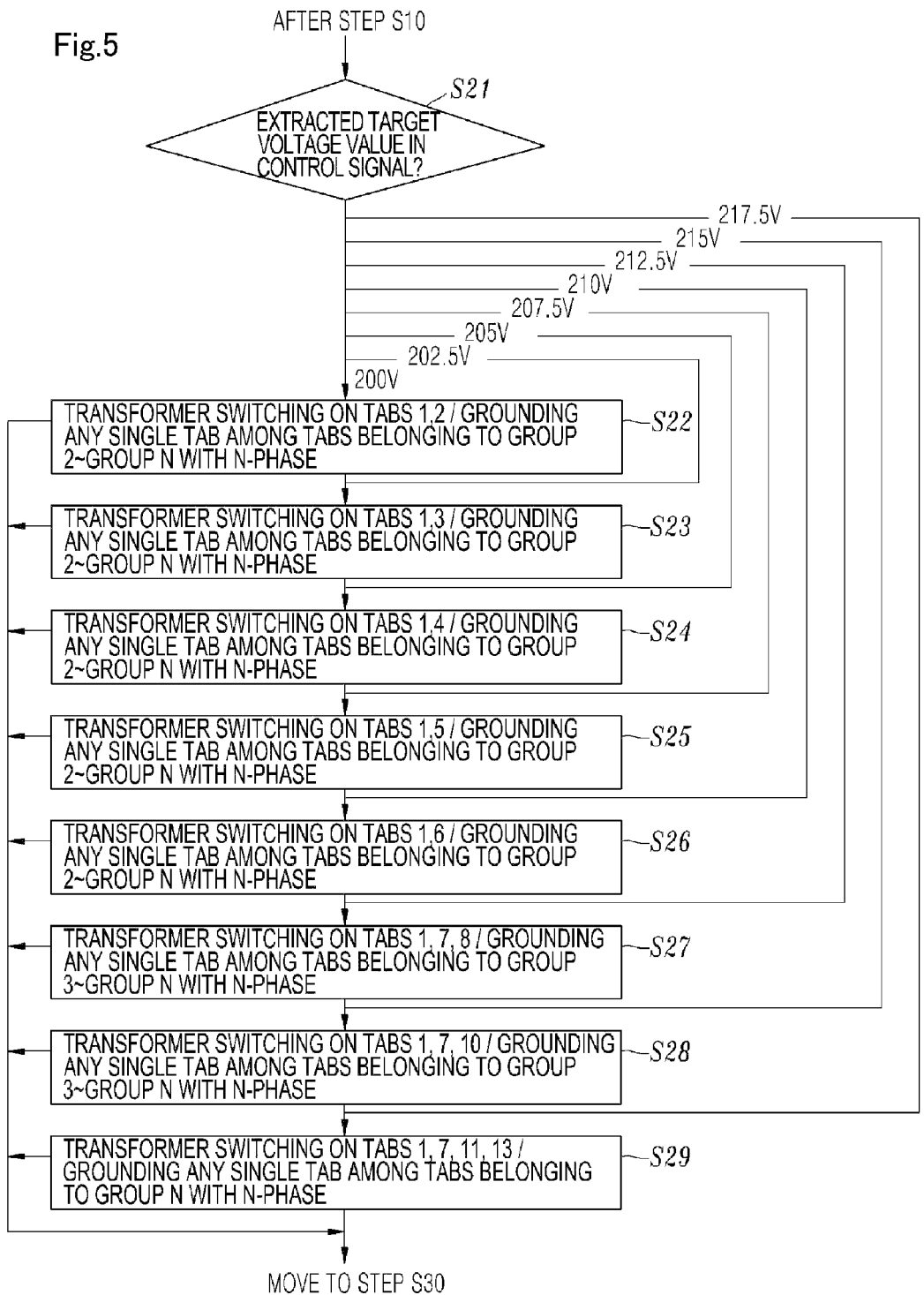

POWER CONTROL SYSTEM AND METHOD THEREFOR

TECHNICAL FIELD

The present invention relates to an electric power control system and method, particularly relates to technique to prevent failure by suppressing the transient high voltage which occurs during the change of a transformer tab, and thereby an electric power control can be enabled arbitrarily.

BACKGROUND ART

In general, the so-called slidacs is used as voltage adjustment device for alternating current (AC). The slidacs operates as the transformer for voltage adjustment because constant input power is supplied and target output voltage can be outputted arbitrarily. Its voltage adjustment is possible but it needs monitoring by an operator, and also lacks function of regulation for output stabilization. Thus the slidacs is not appropriate for power source for load or equipment requiring a stable alternating current (AC) voltage.

In order to improve such problems, a special device for power stabilization such as an automatic voltage regulator has been developed and used.

An automatic voltage regulator is an apparatus to maintain the output voltage at a constant value, and the automatic voltage regulator is used dependently for an alternator, a DC generator, the rectifier, and etc., and the automatic voltage regulator is used as a standalone device.

Patent document No. 1 discloses a technology for the automatic voltage regulator. The automatic voltage regulator comprises:

- a transformer which has a primary inductive coil inducing the AC voltage input from the power supply section to the secondary side according to turns ratio and a secondary side coil decreasing or increasing the voltage induced from primary coil and outputting to the load side,
- a plurality of tabs equipped in the output terminal of the secondary side coil to supply the load side with the different voltage according to the difference of the secondary side coil turns,
- a switch unit including a plurality of triac devices for switching one tab among the plurality of tabs equipped in the output terminal of the secondary side coil to supply the load side with the voltage decreased or increased by turns ratio set for the corresponding tab, and
- a control unit for performing switching control of the switch unit to supply constantly the corresponding voltage according to user's setting of the load-side supply voltage.

In the prior patent as described above, in case the output is set to 220V, when the tab of the triac device is switched to ON state, the voltage of 20V is generated on the opposite windings. Thus, in case of the input of 220V, 200V is outputted from its configuration.

But, a high EMF (electromotive force) is generated in the winding of the unused tab, and a high voltage is induced in the triacs, which causes a problem, that is, a conduction of the triacs regardless of ON/OFF signal.

That is, the conventional cases have the disadvantages that cause the triac problem by inducing the high EMF in the other unused tabs.

PRIOR ART DOCUMENT

Patent Document

Patent document No. 1: Korean Patent Publication No. 2011-0002779 A1

SUMMARY OF THE INVENTION

Problem to be Solved by the Invention

The present invention is devised to solve the problem described above, and the purpose of the present invention is to prevent the failure by suppressing an instantaneous or transient high voltage which occurs while changing the tab by switching a coil winding to correspond to a target output voltage, and enable an arbitrary electric power control.

Also, the purpose of the present invention is to control a target voltage only with a main transformer without an auxiliary transformer and prevent the voltage induced from primary coil to secondary coil by grounding unnecessary tabs with N-phase for adjustment to the target voltage.

And also the purpose of the present invention is to solve the problems, in the electric power control attribute, of foremost important instantaneous or transient operation characteristic and the resulting adverse effects such as instantaneous or transient high voltage, waveform distortion, harmonic generation, the power factor decrease, burnout of the power semiconductor device, burnout of the control transformer part device and addition of unnecessary expensive component, etc. by switching the coil winding to correspond to the target output voltage.

Means for Solving the Problems

The output voltage adjustment system in the present invention comprises a control unit and a transformer connected thereto, wherein:

- the control unit detects an input voltage in real-time, controls the switching of triac device equipped in the transformer, and applies a control signal which switches the triac device for the target voltage output to the transformer in many triac devices; and
- the transformer controls an output voltage by switching tab of the triac device according to the control signal, supplies the power by switching the tab of the triac device corresponding to target voltage included in the control signal to ON state, and prevents the voltage induced from the primary coil to the secondary coil by grounding the unnecessary tab of the triac device with N-phase for adjustment to the target voltage.

And in the present invention, the method for adjusting output voltage comprises steps of:

(a) applying a control signal which controls in order to enable a voltage output corresponding to a target voltage to the transformer in the control unit;
(b) switching a triac device connected to either of group 1 or group N to ON/OFF so as to correspond to the control signal in the transformer; and
(c) outputting target voltage in the transformer.

According to one point of view, an electric power control system of the present invention comprises:

- a transformer including primary coil and secondary coil,
- a triac device group comprising a plurality of the triac devices equipped in the transformer, configured by from group 1 to group N and including a plurality of tabs, a control unit detecting a varying input voltage in real-time, controlling the switching of the triac device group and applying a control signal to the transformer to switch the triac device among the plurality of the triac devices for outputting a target voltage, a triac device switching section comprising a plurality of the triac devices, being equipped between group 1 to group N, and switching a connection between each group and the other group to ON/OFF to correspond to the control signal of the control unit, and the control unit switching any single tab among the tabs belonging to group 1 to group N of the transformer to ON state to output the target voltage, controlling so that the group which have no any tab switched to ON state grounds any single tab among the group with N-phase, and preventing induced transient voltage to the secondary coil with the primary coil.

Besides, in the electric power control system of the present invention, the transformer comprises:

a triac device group configuring group 1 to group N inducting a plurality of tabs and applying the voltage to the secondary coil by switching the tab corresponding to control signal approved from control unit to ON/OFF;

the secondary coil connected to the triac device group with winding done as predetermined number of windings for the target voltage output;

fuse configured between the triac device group and the secondary coil to block short circuit current and overload current;

resistor configured between the fuse and the secondary coil to release externally the heat due to overload current; and primary coil outputting the target voltage attenuated by the secondary coil.

An electric power control method according to the present invention comprises the steps of:

(a) applying control signal which controls in order to enable voltage output corresponding to target voltage to the transformer in control unit;

(b) switching the triac device connected to any single tab among group 1 to group N to ON/OFF so as to correspond to the control signal in the transformer; and (c) outputting the target voltage in the transformer;

wherein the step of (b) comprises steps of:

(b-1) extracting the target voltage from the control signal received by the transformer;

(b-2) controlling so that the transformer switches the triac device connected to tab 1 and tab 2 included in group 1 to ON state, and any single tab among tabs belonging to any group among group 2 to group N is grounded with N-phase in case the target voltage as the extraction result of the step (b-1) is 200V;

(b-3) controlling so that the transformer switches the triac device connected to tab 1 and tab 3 included in group 1 to ON state, and any single tab among tabs belonging to any group among group 2 to group N is grounded with N-phase in case the target voltage as the extraction result of the step (b-1) is 202.5V;

(b-4) controlling so that the transformer switches the triac device connected to tab 1 and tab 4 included in group 1 to ON state, and any single tab among tabs belonging to any group among group 2 to group N is grounded with N-phase in case the target voltage as the extraction result of the step (b-1) is 205V;

(b-5) controlling so that the transformer switches the triac device connected to tab 1 and tab 5 included in group 1 to ON state, and any single tab among tabs belonging to any group among group 2 to group N is grounded with N-phase in case the target voltage as the extraction result of the step (b-1) is 207.5V;

(b-6) controlling so that the transformer switches the triac device connected to tab 1 and tab 6 included in group 1 to ON state, and any single tab among tabs belonging to any group among group 2 to group N is grounded with N-phase in case the target voltage as the extraction result of the step (b-1) is 210V;

(b-7) controlling so that the transformer switches the triac device connected to tab 1, tab 7 and tab 8 included in group 1 and group 2 to ON state, and any single tab among tabs belonging to any group among group 3 to group N is grounded with N-phase in case the target voltage as the extraction result of the step (b-1) is 212.5V;

(b-8) controlling so that the transformer switches the triac device connected to tab 1, tab 7 and tab 10 included in group 1 and group 2 to ON state, and any single tab among tabs belonging to any group among group 3 to group N is grounded with N-phase in case the target voltage as the extraction result of the step (b-1) is 215V; and (b-9) controlling so that the transformer switches the triac device connected to tab 1, tab 7, tab 11 and tab 13 included in group 1 to group 3 to ON state, and any single tab among tabs belonging to group N is grounded with N-phase in case the target voltage as the extraction result of the step (b-1) is 217.5V.

Effect of the Invention

According to the electric power control system of the present invention as described above, instantaneous or transient high voltage which occurs while changing the tab during transformer operation can be suppressed and power can be controlled arbitrarily by switching the coil winding to correspond to a target output voltage.

Also, according to the electric power control system of the present invention, target voltage only with the main transformer is controlled without the auxiliary transformer and the high EMF induced in the secondary coil is prevented by grounding unnecessary tabs with N-phase for adjustment to the target voltage.

And the electric power control system of the present invention has the advantage that the problems of instantaneous operation characteristic and the resulting adverse effects such as instantaneous high voltage, waveform distortion, harmonic generation, the power factor decrease, burnout of the power semiconductor device, burnout of control transformer part device and addition of unnecessary expensive component, etc. can be solved by switching the coil winding to correspond to the target output voltage.

BRIEF DESCRIPTION OF THE DRAWINGS

FIG. 5 is a flow chart illustrating a detailed procedure for step S20 of the electric power control method according to the present invention.

MODE FOR CARRYING OUT THE INVENTION

Specific features and advantages of the present invention will be more clearly understood from the following detailed description when taken in conjunction with the accompanying drawings. The terminologies or words used in the description and the claims of the present invention should be interpreted based on the meanings and concepts of the invention in keeping with the scope of the invention based on the principle that the inventors can appropriately define the terms in order to describe the invention in the best way.

Figure 1:
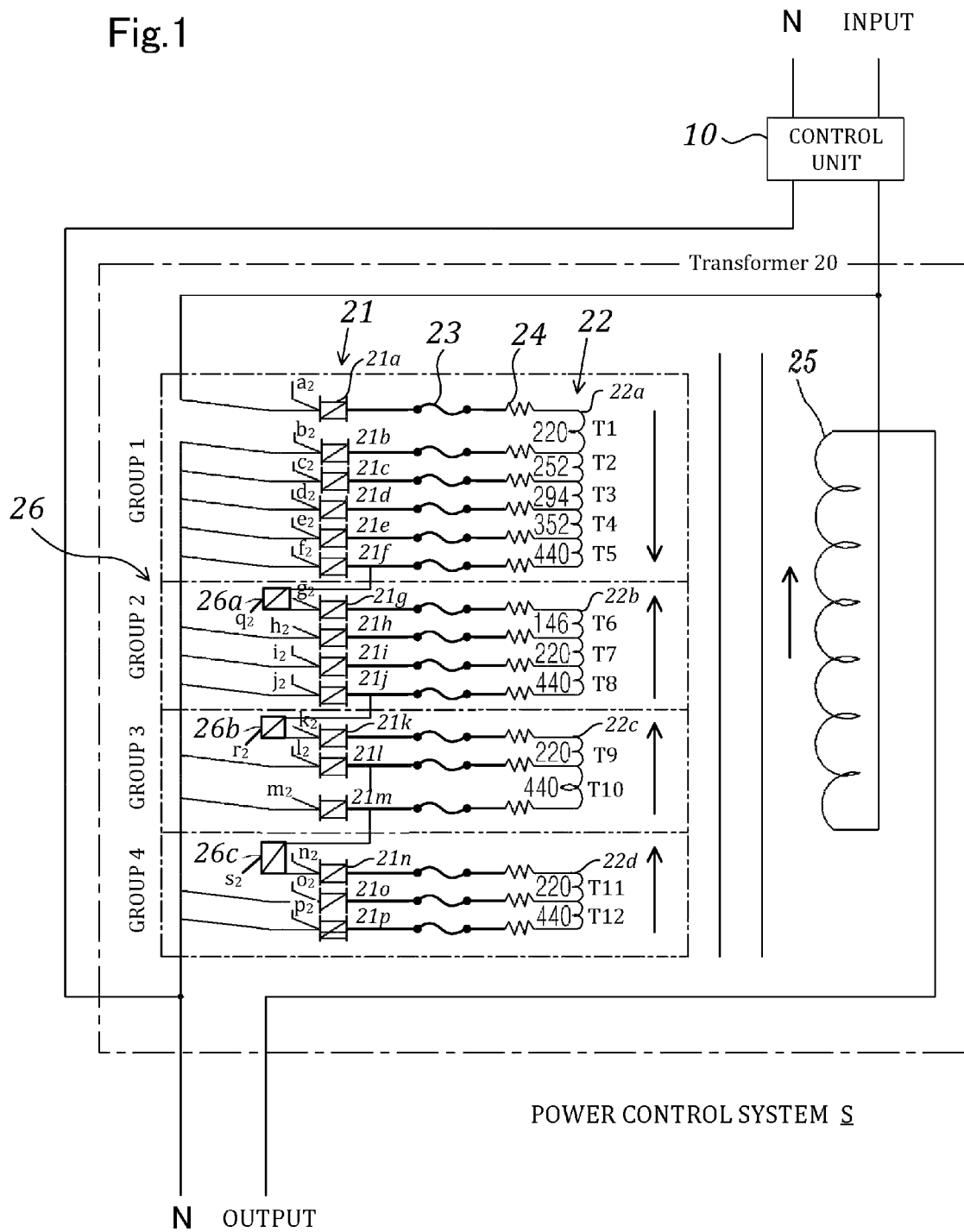
FIG. 1 is a partial configuration diagram illustrating an electric power control system according to the present invention.

As illustrated in FIG. 1, the electric power control system S for the output voltage adjustment according to the present invention comprises a control unit 10 and a transformer 20. The transformer 20 includes the primary coil 25 and the secondary coil 22.

First, the control unit 10 detects varying input voltage in real-time, and controls the switching of the triac devices equipped in the transformer, and applies control signal which switches the triac device for a target voltage output among triac device group 21 comprising many triac devices to the transformer 20. In addition, as an illustration in FIG. 1, 16 (sixteen) triac devices 21a-21p are described. Therefore, based on this, hereinafter the explanation is performed.

Figure 2:
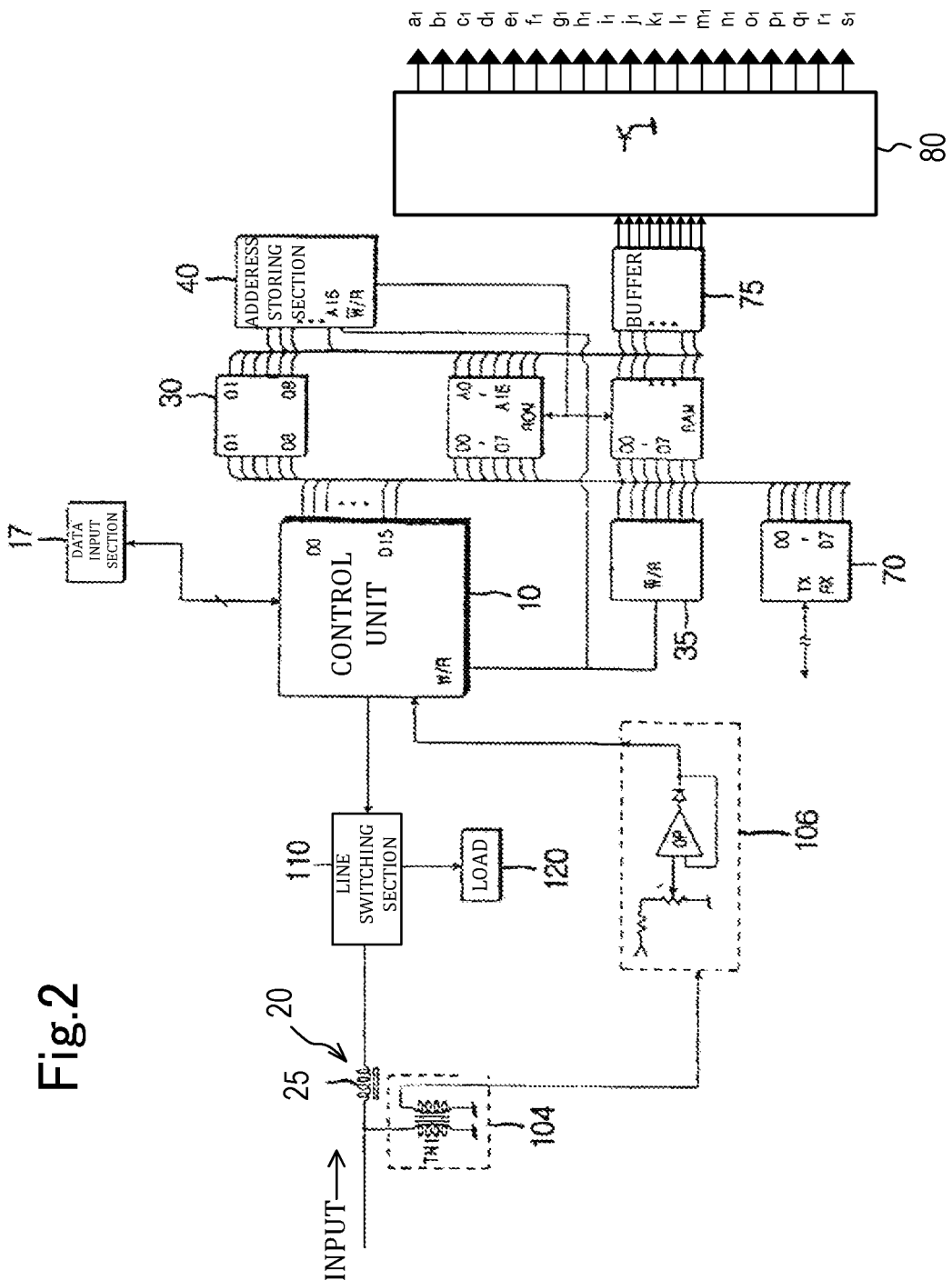
FIG. 2 is a whole configuration diagram illustrating an electric power control system according to the present invention.
Figure 3:
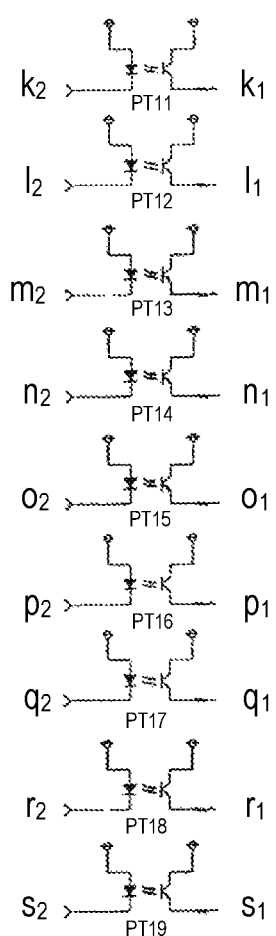
FIG. 3 is a configuration diagram illustrating an overcurrent protecting section applying to an electric power control system according to the present invention.
Figure 3:
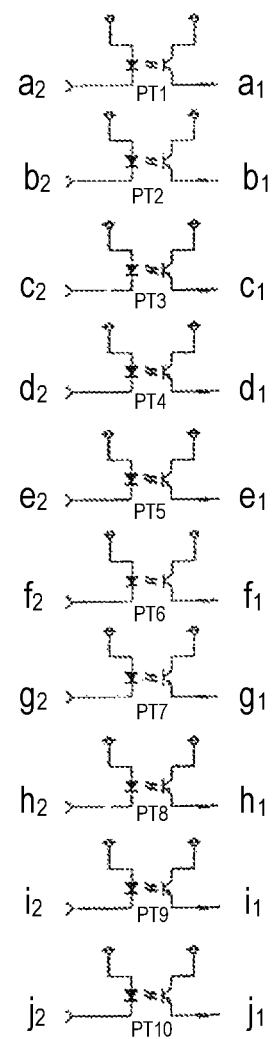

Besides, as illustrated in FIG. 2, the electric power control system S includes an input voltage detecting section 104, a first amplifying section 106, a line switching section 110, an address storing section 40, a perpetual almanac data storing section 35, a latch section 30, an interface section 70, a buffer 75, an overcurrent protecting section 50 (refer to FIG. 3), a second amplifying section 80 and the triac device group 21.

The input voltage detecting section 104 includes a compact transformer TN1 connected to a front end of a first coil 25 which functions as an output voltage adjusting section, the first coil connected in series to a load 120 to regulate a voltage supplied to the load 120. The input voltage detecting section detects a current and voltage of an AC power inputted to an input terminal, and outputs the detected result to an input port of the control unit 10 through the first amplifying section 106.

The control unit 10 outputs a plurality of trigger control signals according to the data outputted from the input voltage detecting section 104. Furthermore, the control unit 10 controls peripheral equipments to operate the load according to a predetermined time, and identifies the condition of the system to output a data corresponding to the result.

The line switching section 110 interrupts the electric power supplied to the load 120 in response to a line switching control signal outputted from the control unit 10, when an overvoltage or overcurrent is supplied to the load 120, when any error is happened at the result of testing the system by which a system testing data is inputted to a data input section 17. In addition, the explanation of the means of detection of supply of the overvoltage or the overcurrent to the load 120 is omitted because this is unrelated to the present invention.

The address storing section 40 is configured by memories that specific data of the electric power control system are stored. The perpetual almanac data storing section 35 includes a memory device for storing data corresponding to years, the date of months, days, days of the week, and hours. The latch section 30 includes a plurality of D-type flip-flops which are latch devices so that the latch section latches a data outputted from the control unit 10 to output an address signal.

The interface section 70 includes an interface for transferring the data corresponding to the test result of the system and the data corresponding to a serial number, and years, the date of months, days, days of the week, and hours to the peripheral equipments.

The buffer 75 buffers an address and supplies to the peripheral equipments and further the buffer 75 buffers the trigger control signal outputted from the control unit 10.

The overcurrent protecting section 50 includes photo sensors PT1 to PT19 each driven by the trigger control signals from the control unit 10 through the buffer 75 and the second amplifying section 80, thereby a high voltage induced at the secondary coil 22 as described below is not supplied to the control unit 10.

The triac device group 21 includes the triac devices 21a-21p which vary the number of windings of the secondary coil 22 according to the operation of the photo sensors PT1 to PT19, and the fuse 23 and the high resistor 24 which protect the triac devices 21a-21p.

In addition, the triac devices 21a-21p are configured by 4 (four) groups including 16 (sixteen) tabs $a_2$-$p_2$, and applies the voltage to the secondary coil 22 by switching the tab corresponding to the control signal supplied from the control unit 10 to ON/OFF. Specifically, the triac devices 21a-21f are allocated to the group 1, the triac devices 21g-21j are allocated to the group 2, the triac devices 21k-21m are allocated to the group 3 and the triac devices 21n-21p are allocated to the group 4 respectively.

Besides, the secondary coil 22 is configured by 4 (four) coils 22a-22d, and a first coil 22a is connected to the triac devices 21a-21f, a second coil 22b is connected to the triac devices 21g-21j, a third coil 22c is connected to the triac devices 21k-21m and a fourth coil 22d is connected to the triac devices 21n-21p respectively, and these are wound with the predetermined number of windings in order to output the target voltage. That is, the first coil 22a is configured by 5 (five) winding sections T1-T5, the second coil 22b is configured by 3 (three) winding sections T1-T3, the third coil 22c is configured by 2 (two) winding sections T1 and T2, and the fourth coil 22d is configured by 2 (two) winding sections T1 and T2 respectively, and the number of windings of the secondary coil 22 can be changed by selecting these winding sections as appropriate.

In addition, a polarity of the first coil 22a becomes active polarity because winding direction is same direction as the primary coil 25, and the direction of the voltage induced between both windings becomes opposite. On the other hand, polarities of the second coil 22b, the third coil 22c and the fourth coil 22d become subtractive polarities because winding directions are opposite directions as the primary coil 25, and the direction of the voltage induced between both windings becomes same. The directions of these voltages are illustrated by arrows in FIG. 1. Therefore, adjustment (supply of voltage or reduction of voltage) for input voltage of the first coil 22a becomes possible by combining the first coil 22a, the second coil 22b, the third coil 22c and the fourth coil 22d as appropriate as described above.

And the transformer 20 controls its output voltage by switching at least two or more tabs among the triac devices 21a-21p according to control signal of the control unit 10, supplies power by switching the tab of the triac device corresponding to a target voltage included in control signal to ON, and prevents the induced voltage from the primary coil to the secondary coil by grounding unnecessary tab of the triac device with N-phase for adjustment to the target voltage. Wherein, N-phase is intended to mean an earth wire in 3-wire or 2-wire power distribution.

Specifically, the control unit 10 measures varying input voltage in real-time, inputs the value of target voltage that the administrator wants to output, and in case the input voltage is 220V and the target voltage is 200V, control unit 10 applies control signal which switches the triac device 21*a* and the triac device 21*b* connected to tab 1 $a_2$ and tab 2 $b_2$ included in group 1 of the transformer 20 to ON state and controls so as to ground any single tab among tabs belonging to any group among group 2 to group 4 with N phase to the transformer 20.

And in case the input voltage is 220V and the target voltage is 202.5V, the control unit 10 applies control signal which switches the triac device 21*a* and the triac device 21*c* connected to tab 1 $a_2$ and tab 3 $c_2$ included in group 1 of the transformer 20 to ON state and controls so as to ground any single tab among tabs belonging to any group among group 2 to group 4 with N phase to the transformer 20.

Further in case the input voltage is 220V and the target voltage is 205V, the control unit 10 applies control signal which switches the triac device 21*a* and the triac device 21*d* connected to tab 1 $a_2$ and tab 4 $d_2$ included in group 1 of the transformer 20 to ON state and controls so as to ground any single tab among tabs belonging to any group among group 2 to group 4 with N phase to the transformer 20.

As described above, also in case the target voltage is 207.5V, 210V, 212.5V, 215V or 217.5V, the control unit 10 applies control signal which switches either of tab among tabs belonging to the range of group 1 to group 4 of the transformer 20 to ON state and controls so that the group which doesn't have any tab switched to ON state grounds any single tab among tabs belonging to the corresponding group with N-phase to the transformer 20.

Thus, the control unit 10 switches some of the plurality of tabs among group 1 to group 4 for target voltage output to ON state, and ground the group except for the group including the tab for target voltage output with N phase, thereby the induced voltage from the primary coil to the secondary coil is prevented.

In this time, although the target voltage is either of 200V, 202.5V, 205V, 207.5V, 210V, 212.5V or 217.5V, the present invention is not limited to these.

Also, in case the input voltage is 220V and the target voltage is 220V, the control unit 10 grounds the triac device 21*b*, the triac device 21*g*, the triac device 21*k*, the triac device 21*n* and the triac device 21*o* connected to tab 2 $b_2$, tab 7 $g_2$, tab 11 $k_2$, tab 14 $n_2$ and tab 15 $o_2$ of the transformer 20 with N-phase and applies control signal so as to output the input voltage in bypass form to the transformer 20.

In addition, between the triac device group 21 and the secondary coil 22, the fuse 23 is arranged to block short circuit current and overload current and the resistor 24 is arranged to release the heat due to overload current externally. The number of these fuse 23 and resistor 24 is same as the triac devices 21*a*-21*p*.

Also, the primary coil 25 outputs the target voltage adjusted (supply of voltage or reduction of voltage) by 4 (four) coils 22*a*-22*d* which configures the secondary coil 22 as described above.

In switching section 26 of the triac device, a first switching section 26*a* is equipped between group 1 configured by 6 (six) triac devices 21*a*-21*f* and group 2 configured by 4 (four) triac devices 21*g*-21*j*, a second switching section 26*b* is equipped between group 2 and group 3 configured by 3 (three) triac devices 21*k*-21*m* and a third switching section 26*c* is equipped between group 3 and group 4 configured by 3 (three) triac devices 21*n*-21*p*, and the switching section 26 of the triac device switches the connection between each group and the other group to ON/OFF to correspond to control signal of the control unit 10.

Hereafter, the operational aspects of the electric power control system for the output voltage adjustment system according to the present invention is shown as below.

First, the control unit 10 detects varying input voltage in real-time, and in case the input voltage is 220V and the target voltage is 200V, and control unit switches the triac device 21*a* and the triac device 21*b* connected to tab 1 $a_2$ and tab 2 $b_2$ of the transformer 20 to ON state and controls so as to supply and receive the power. That is, the triac device 21*a* and the triac device 21*b* operate, the number of windings of the secondary coil 22 is varied, increase/decrease of flux linkage amount is controlled, and always constant voltage is outputted and supplied to the load 120 regardless of level of commercial AC power supply that the voltage which is outputted at the primary coil 25 is supplied to input end.

Then, the control unit 10 controls the triac device 21*i*, the triac device 21*l* and the triac device 21*n* connected to tab 9 $i_2$, tab 12 $l_2$, and tab 14 $n_2$ of the transformer 20 to ground with N-phase. At this time, it is possible to ground the triac device 21*j*, the triac device 21*m* and the triac device 21*p* connected to tab 10 j2, tab 13 $m_2$, and tab 16 $p_2$ instead of tab 9 $i_2$, tab 12 $l_2$, and tab 14 $n_2$ with N-phase.

Thus, the transformer 20 supplies the power to the triac device connected to the tab corresponding to the target voltage and grounds the triac devices 21 connected to the tab which is unused for outputting target voltage with N phase, and thereby any problem which may occur in the triac device group 21 or the control unit 10 by high voltage induced to the secondary coil 22 from the primary coil 25 can be prevented.

Figure 4:
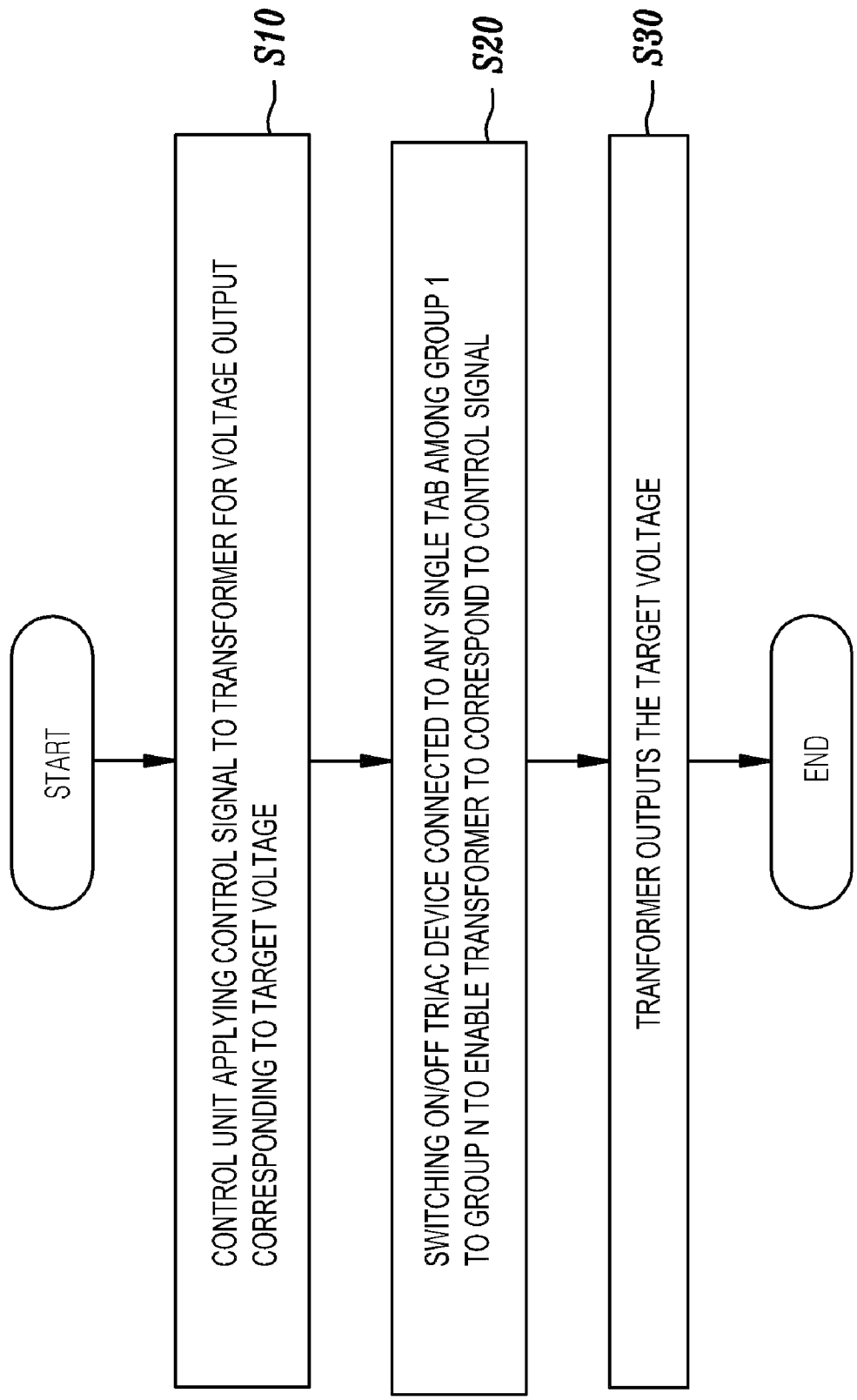
FIG. 4 is a flow chart illustrating an electric power control method according to the present invention.

Hereinafter, with reference to FIG. 4, the electric power control method according to the present invention is explained as below.

First, the control unit 10 applies control signal to the transformer 20 in order to output the voltage corresponding to the target voltage (S10).

Subsequently, the transformer 20 switches the triac device connected to any single tab among group 1 to group 4 to correspond to the above-described control signal to ON/OFF (S20).

And, the transformer 20 outputs the target voltage (S30).

Specifically, with reference to FIG. 5, the detailed process of step S20 of the electric power control method according to the present invention is shown as below.

After step S10, the target voltage is extracted from the control signal which is inputted in the transformer 20 (S21).

From the extraction result from step S21, in case the target voltage is 200V, the transformer 20 switches the triac device 21*a* and the triac device 21*b* connected to tab 1 $a_2$ and tab 2 $b_2$ included in group 1 to ON state, and controls any single tab among tabs belonging to any group among group 2 to group 4 respectively to ground with N-phase (S22).

From the extraction result from step S21, in case the target voltage is 202.5V, the transformer 20 switches the triac device 21*a* and the triac device 21*c* connected to tab 1 $a_2$ and tab 3 $c_2$ included in group 1 to ON state, and controls any single tab among tabs belonging to any group among group 2 to group 4 respectively to ground with N-phase (S23).

From the extraction result from step S21, in case the target voltage is 205V, the transformer 20 switches the triac device 21a and the triac device 21d connected to tab 1 $a_2$ and tab 4 $d_2$ included in group 1 to ON state, and controls any single tab among tabs belonging to any group among group 2 to group 4 respectively to ground with N-phase (S24).

From the extraction result from step S21, in case the target voltage is 207.5V, the transformer 20 switches the triac device 21a and the triac device 21e connected to tab 1 $a_2$ and tab 5 $e_2$ included in group 1 to ON state, and controls any single tab among tabs belonging to any group among group 2 to group 4 respectively to ground with N-phase (S25).

From the extraction result from step S21, in case the target voltage is 210V, the transformer 20 switches the triac device 21a and the triac device 21f connected to tab 1 $a_2$ and tab 6 $f_2$ included in group 1 to ON state, and controls any single tab among tabs belonging to any group among group 2 to group 4 respectively to ground with N-phase (S26).

From the extraction result from step S21, in case the target voltage is 212.5V, the transformer 20 switches the triac device 21a, the triac device 21g and the triac device 21h connected to tab 1 $a_2$, tab 7 $g_2$ and tab 8 $h_2$ included in group 1 and group 2 to ON state, and controls any single tab among tabs belonging to any group among group 3 and group 4 respectively to ground with N-phase (S27).

From the extraction result from step S21, in case the target voltage is 215V, the transformer 20 switches the triac device 21a, the triac device 21g and the triac device 21j connected to tab 1 $a_2$, tab 7 $g_2$ and tab 10 $j_2$ included in group 1 and group 2 to ON state, and controls any single tab among tabs belonging to any group among group 3 to group 4 respectively to ground with N-phase (S28).

From the extraction result from step S21, in case the target voltage is 217.5V, the transformer 20 switches the triac device 21a, the triac device 21g, the triac device 21k and the triac device 21m connected to tab 1 $a_2$, tab 7 $g_2$, tab 11 $k_2$ and tab 13 $m_2$ included in group 1 to group 3 to ON state, and controls any single tab among tabs belonging to group 4 to ground with N-phase (S29).

In addition, in embodiments as described above, the triac device group 21 is configured with 16 (sixteen) triac devices 21a-21p, the secondary coil 22 is configured with 4 (four) coils 22a-22d in order to be divided into 4 (four) groups, and the switching section 26 of the triac device is configured with 3 (three) switching section 26a-6c. However, not only this, if the target voltage can be outputted, these may be configured by any means.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Thus, all such appropriate changes and modifications and equivalents should be considered as fall within the scope of the invention.

What is claimed is:

1. An electric power control system comprising:
   a transformer (20) including primary coil (25) and secondary coil (22),
   a triac device group (21) comprising a plurality of triac devices equipped in the transformer, configured by from group 1 to group N and including a plurality of tabs,
   a control unit (10) detecting a varying input voltage in real-time, controlling the switching of the triac device group and applying a control signal to the transformer to switch the triac device among the plurality of the triac devices for outputting a target voltage,
   a triac device switching section (26) comprising a plurality of the triac devices, being equipped between group 1 to group N, and switching a connection between each group and the other group to ON/OFF to correspond to the control signal of the control unit, and
   the control unit applying the control signal to switch at least one single tab among the tabs belonging to group 1 to group N of the transformer to ON state to output the target voltage, and grounding each single tab with N phase in each group which has no tab switched to ON state to prevent induced transient voltage to the secondary coil with the primary coil,
   wherein the transformer comprises:
      secondary coil (22) connected to the triac device group (21) with winding done as predetermined number of windings for the target voltage output;
      fuse (23) configured between the triac device group and the secondary coil to block short circuit current and overload current;
      resistor (24) configured between the fuse and the secondary coil to release externally the heat due to overload current; and
      primary coil (25) outputting the target voltage attenuated by the secondary coil (22), and
   wherein the triac device group (21) configuring group 1 to group N applies a voltage to the secondary coil by switching the tab corresponding to the control signal approved from control unit to ON/OFF.

2. An electric power control method, wherein the method comprises the steps of:
   (a) applying control signal which controls in order to enable voltage output corresponding to target voltage to the transformer (20) in control unit (10);
   (b) switching a triac device connected to any single tab among group 1 to group N to ON/OFF so as to correspond to the control signal in the transformer; and
   (c) outputting the target voltage in the transformer,
   wherein the step of (b) comprises steps of:
   (b-1) extracting the target voltage from the control signal received by the transformer;
   (b-2) controlling so that the transformer (20) switches the triac device connected to tab 1 and tab 2 included in group 1 to ON state, and any single tab among tabs belonging to any group among group 2 to group N is grounded with N-phase in case the target voltage as the extraction result of the step (b-1) is 200V;
   (b-3) controlling so that the transformer (20) switches the triac device connected to tab 1 and tab 3 included in group 1 to ON state, and any single tab among tabs belonging to any group among group 2 to group N is grounded with N-phase in case the target voltage as the extraction result of the step (b-1) is 202.5V;
   (b-4) controlling so that the transformer (20) switches the triac device connected to tab 1 and tab 4 included in group 1 to ON state, and any single tab among tabs belonging to any group among group 2 to group N is grounded with N-phase in case the target voltage as the extraction result of the step (b-1) is 205V;
   (b-5) controlling so that the transformer (20) switches the triac device connected to tab 1 and tab 5 included in group 1 to ON state, and any single tab among tabs belonging to any group among group 2 to group N is grounded with N-phase in case the target voltage as the extraction result of the step (b-1) is 207.5V;

(b-6) controlling so that the transformer (20) switches the triac device connected to tab 1 and tab 6 included in group 1 to ON state, and any single tab among tabs belonging to any group among group 2 to group N is grounded with N-phase in case the target voltage as the extraction result of the step (b-1) is 210V;

(b-7) controlling so that the transformer (20) switches the triac device connected to tab 1, tab 7 and tab 8 included in group 1 and group 2 to ON state, and any single tab among tabs belonging to any group among group 3 to group N is grounded with N-phase in case the target voltage as the extraction result of the step (b-1) is 212.5V;

(b-8) controlling so that the transformer (20) switches the triac device connected to tab 1, tab 7 and tab 10 included in group 1 and group 2 to ON state, and any single tab among tabs belonging to any group among group 3 to group N is grounded with N-phase in case the target voltage as the extraction result of the step (b-1) is 215V; and (b-9) controlling so that the transformer (20) switches the triac device connected to tab 1, tab 7, tab 11 and tab 13 included in group 1 to group 3 to ON state, and any single tab among tabs belonging to group N is grounded with N-phase in case the target voltage as the extraction result of the step (b-1) is 217.5V.

* * * * *